(12) United States Patent
Okamura et al.

(10) Patent No.: US 12,342,293 B2
(45) Date of Patent: Jun. 24, 2025

(54) TERMINAL AND RADIO COMMUNICATION METHOD

(71) Applicant: NTT DOCOMO, INC., Tokyo (JP)

(72) Inventors: Masaya Okamura, Tokyo (JP); Yuki Matsumura, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 373 days.

(21) Appl. No.: 17/765,574

(22) PCT Filed: Oct. 3, 2019

(86) PCT No.: PCT/JP2019/039198
§ 371 (c)(1),
(2) Date: Mar. 31, 2022

(87) PCT Pub. No.: WO2021/064962
PCT Pub. Date: Apr. 8, 2021

(65) Prior Publication Data
US 2022/0353827 A1    Nov. 3, 2022

(51) Int. Cl.
*H04W 52/36* (2009.01)
*H04B 7/0456* (2017.01)
*H04L 5/00* (2006.01)
*H04W 72/23* (2023.01)

(52) U.S. Cl.
CPC ........ *H04W 52/367* (2013.01); *H04B 7/0456* (2013.01); *H04L 5/0048* (2013.01); *H04W 72/23* (2023.01)

(58) Field of Classification Search
CPC . H04W 52/42; H04W 52/146; H04W 52/288; H04W 72/23; H04W 52/367; H04W 8/24; H04B 7/0456; H04B 7/0689; H04B 7/0404; H04L 5/0048

See application file for complete search history.

(56) References Cited

U.S. PATENT DOCUMENTS

| 2020/0154364 | A1* | 5/2020 | Rahman | H04B 7/0404 |
| 2020/0186215 | A1* | 6/2020 | Rahman | H04L 5/0091 |
| 2020/0266867 | A1* | 8/2020 | Park | H04B 7/0478 |
| 2020/0383062 | A1* | 12/2020 | Wang | H04L 25/0226 |
| 2021/0351827 | A1* | 11/2021 | Hao | H04B 7/0639 |

(Continued)

OTHER PUBLICATIONS

International Search Report issued in PCT/JP2019/039198 on Nov. 19, 2019 (2 pages).

(Continued)

*Primary Examiner* — Andrew Lee
(74) *Attorney, Agent, or Firm* — Osha Bergman Watanabe & Burton LLP

(57) ABSTRACT

A terminal according to an aspect of the present disclosure includes a control section that determines whether or not to perform uplink shared channel transmission for an antenna selection TPMI precoder at full power on the basis of a reported full power transmission mode to be supported and a reported transmitted preceding matrix indicator (TPMI) group, and a transmitting section that performs the uplink shared channel transmission using the antenna selection TPMI precoder. According to one aspect of the present disclosure, it is possible to control full power transmission appropriately.

4 Claims, 8 Drawing Sheets

(56) References Cited

U.S. PATENT DOCUMENTS

2022/0109474 A1* 4/2022 Haghighat .......... H04B 7/0465
2022/0287059 A1* 9/2022 Huang ................ H04W 52/146

OTHER PUBLICATIONS

Written Opinion of the International Searching Authority issued in PCT/JP2019/039198 on Nov. 19, 2019 (5 pages).
Samsung; "View on full power UL transmission"; 3GPP TSG RAN WG1 meeting #98, R1-1908503; Prague, CZ; Aug. 26-30, 2019 (10 pages).
Oppo; "Discussion on the Full TX power UL transmission"; 3GPP TSG RAN WG1 Meeting #98, R1-1908353; Prague, CZ; Aug. 26-30, 2019 (10 pages).
Qualcomm Incorporated; "Full Tx power for UL transmissions"; 3GPP TSG RAN WG1 #98, R1-1909274; Prague, CZ; Aug. 26-30, 2019 (12 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).
Office Action issued in the counterpart Chinese Application No. 201980102761.9, mailed Oct. 26, 2023 (15 pages).
Office Action issued in counterpart Chinese Patent Application No. 201980102761.9 mailed on May 6, 2023 (22 pages).
Office Action issued in counterpart Japanese Patent Application No. 2021-550901 mailed on May 9, 2023 (11 pages).
Spreadtrum Communications; "Discussion on full TX power for UL transmission"; 3GPP TSG RAN WG1 #98, R1-1908960; Prague, Czech Republic; Aug. 26-30, 2019 (7 pages).
Office Action issued in Chinese Application No. 201980102761.9, mailed Mar. 1, 2024 (19 pages).

* cited by examiner

UE capability
supportedFullTxPowerUlTransmission
supportedFullTxPowerUlTransmissionMode1Mode2
TpmiGroupForFullTxPowerUlTransmission

FIG. 3

UE capability
supportedFullTxPowerUlTransmission
supportedFullTxPowerUlTransmissionMode1
supportedFullTxPowerUlTransmissionMode2
TpmiGroupForFullTxPowerUlTransmission

FIG. 4

TERMINAL AND RADIO COMMUNICATION METHOD

TECHNICAL FIELD

The present disclosure relates to a terminal and a radio communication method in next-generation mobile communication systems.

BACKGROUND ART

In the universal mobile telecommunications system (UMTS) network, the specifications of long term evolution (LTE) have been drafted for the purpose of further increasing data rates, providing low delays, and so on (see Non Patent Literature 1). In addition, the specifications of LTE-Advanced (third generation partnership project (3GPP) Release (Rel.) 10 to 14) have been drafted for the purpose of further increasing capacity and advancement of LTE (3GPP Rel. 8 and 9).

Successor systems to LIE (for example, also referred to as 5th generation mobile communication system (5G), 5G+ (plus), New Radio (NR), or 3GPP Rel. 15 or later) are also being studied.

CITATION LIST

Non Patent Literature

Non Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)", April, 2010.

SUMMARY OF INVENTION

Technical Problem

In NR, the capability of a user terminal (or a terminal or user equipment (UE)) related to codebook-based full power UL transmission using a plurality of power amplifiers (PAs) has been studied. Discussions for NR so far has proposed UE capabilities 1 to 3, as follows:
UE capability 1: PAs that can output the maximum rated power (full rated PAs) are supported (included) on each transmission chain (Tx chain).
UE capability 2: no Tx chain supports full rated PA.
UE capability 3: subset (a part) of Tx chains supports full rated PA.

Further, configuring a UE supporting UE capability 2 or 3 to operate in at least one of two modes (modes 1 and 2) for full power transmission has been considered. In Rel-16 NR, a UE reporting UE capability information indicating support for operating in mode 1 or support operating in mode 2 has been considered.

However, in the case where the UE supports both mode 1 and mode 2 and the case where it supports only one of mode 1 and mode 2, no consideration has been made on how the UE controls full power transmission (e.g., control of whether to perform full power transmission, control of power scaling for full power transmission, etc.).

The absence of explicit standards on matters described above makes UE unable to perform full power transmission properly. The inability to perform full power transmission may cause, for example, a decrease in coverage, which leads to difficulty in an increase in communication throughput.

Thus, the present disclosure intends to provide a terminal and radio communication method capable of controlling full power transmission appropriately.

Solution to Problem

A terminal according to an aspect of the present disclosure includes a control section that determines whether or not to perform uplink shared channel transmission for an antenna selection TPMI precoder at full power on the basis of a reported full power transmission mode to be supported and a reported transmitted preceding matrix indicator (TPMI) group, and a transmitting section that performs the uplink shared channel transmission using the antenna selection TPMI precoder.

Advantageous Effects of Invention

According to one aspect of the present disclosure, it is possible to control full power transmission appropriately.

BRIEF DESCRIPTION OF DRAWINGS

FIG. 3 is a diagram illustrating as example of UE capability information in the case where the UE reports only one mode as a mode to be supported.

FIG. 4 is a diagram illustrating an example of UE capability information in a case where the PE reports two modes as a mode to be supported.

DESCRIPTION OF EMBODIMENTS (PUSCH Precoder)

Figure 1:
FIG. 1 is a diagram showing an example of association between a precoder type and a TPMI index.

In the ER, it is considered that the UE will support at least one of codebook (CB)-based transmission and non-codebook (NCB)-based transmission.

For example, it is considered that the UE uses at least a measurement reference signal (Sounding Reference Signal (SRS)) Resource Index (SRI) to determine a precoder (precoding matrix) for at least one of CB-based and NCB-based uplink shared channel (Physical Uplink Shared Channel (PUSCH)) transmissions.

In the case of CB-based transmission, the UE may determine the precoder for PUSCH transmission based on SRI, Transmitted Rank Indicator (TRI), Transmitted Precoding Matrix Indicator (TPMI) or the like. For the NCB-based transmission, the US may determine a precoder for PUSCH transmission based on the SRI.

SRI, TRI, TPMI, or the like may be notified to the UE using downlink control information (DCI). The SRI may be indicated by an SRS Resource Indicator field (SRI field) of the DCI, or may be indicated by a parameter "srs-ResourceIndicator" included in an RRC information element "ConfiguredGrantConfig" of a configured grant PUSCH (configured grant PUSCH). The TRI and the TPMI may be indicated by precoding information of the DCI and a layer number field ("Precoding information and number of layers" field).

The US may report US capability information regarding the precoder type, and the precoder type based on the UE capability information may be configured by higher layer signaling from the base station. The UE capability information may be precoder type information (may be represented by the RRC parameter "pusch-TransCoherence") used by the UE in PUSCH transmission.

In the present disclosure, higher layer signaling may be, for example, any of radio resource control (RRC) signaling, medium access control (MAC) signaling, broadcast information, and the like, or a combination thereof.

For example, a MAC control element (MAC CE), a MAC protocol data unit (ECU), or the like may be used for the MAC signaling. The broadcast information may be, for example, a master information block (MIB), a system information block (SIB), or the like.

The UE may determine the precoder used for PUSCH transmission based on the precoder type information (which may be represented by the RRC parameter "codebookSubset") contained in the PUSCH configuration information ("PUSCH-Config" information element of RRC signaling) notified by higher layer signaling. The USE may be configured with a subset of the PMI indicated by the TPMI by the codebookSubset.

The precoder type may be designated by any of full coherent, fully coherent, coherent, partial coherent, non-coherent, or a combination of at least two of them (for example, which may be represented by parameters such as "fullyAndPartialAndNonCoherent", "partialAndNonCoherent").

Full coherent may mean that the all antenna ports used for transmission are synchronized (may be expressed as phase-matched, the same precoder applied, etc.). Partial coherent may mean that some port of the antenna ports used for transmission are synchronized, but that some port and other ports cannot be synchronized. Non-coherent may mean that each antenna port used for transmission cannot be synchronized.

A UE that supports a fully coherent precoder type may be assumed to support partial coherent and non-coherent precoder types. A UE that supports a partial coherent precoder type may be assumed to support a non-coherent precoder type.

The precoder type may be read as coherency, PUSCH transmission coherence, coherent type, coherence type, codebook type, codebook subset, codebook subset type, and the like.

The UE may determine the precoding matrix corresponding to a TPMI index obtained from the DCI that schedules UL transmission (for example, DCI format 0_1. the same apply hereinafter) from multiple precoders (may be referred to as precoding matrices, a codebook, or the like) for CB-based transmission.

FIG. 1 is a diagram showing an example of association between a precoder type and a TPMI index. FIG. 1 is a table showing the precoding matrix W for transmission in a single layer using four antenna ports in discrete Fourier transform spread OFDM (DFT-s-OFDM) (with transform preceding enabled).

In FIG. 1, if the precoder type (codebookSubset) is fullyAndPartialAndNonCoherent, the US is notified with a TPMI of 0 to 27 for a single layer transmission. In addition, if the precoder type is partialAndNonCoherent, the UE is configured with a TPMI of 0 to 11 for a single layer transmission. If the precoder type is nonCoherent, the US is configured with a TPMI of 0 to 3 for a single layer transmission.

FIG. is a table defined currently in Rel-15 NR. In this table, assuming a fully coherent transmit power corresponding to index #12 to #27 is set to 1 $(½)^2*4)$, a partial coherent transmit power corresponding to index #4 to #11 is set to ½ $(=(½)^2*2)$, and a non-coherent transmit power corresponding to index #0 to #3 is set to ¼ $(=(½)^2*1)$.

In other words, according to the current Rel-15 NR specifications, the use of part of codebooks in a UE performing codebook-based transmission using a plurality ports has smaller transmission power than that of the transmission using a single port in some cases (full power transmission is unable).

Moreover, as illustrated i FIG. 1, the precoding matrix in which only one of the components in respective columns is non-zero can be referred to as a non-coherent codebook. The precoding matrix in which the predetermined number (but not all) of components in respective columns is non-zero can be referred to as a partial coherent codebook. The precoding matrix in which all components in respective columns are non-zeros can be referred to as a fully coherent codebook.

The non-coherent codebook and the partial coherent codebook can also be referred to as an antenna selection precoder. The fully coherent codebook can also be referred to as a non-antenna selection precoder.

Moreover, in the present disclosure, the partial coherent codebook can be a codebook (i.e., codebooks of TPMIs=4 to 11 for single-layer transmission using four antenna ports) obtained by excluding codebooks corresponding to TPMIs specifying a UE configured with a non-coherent codebook subset (e.g., RRC parameter "codebookSubset"="nonCoherent") among codebooks (precoding matrix) corresponding to TPMIs specifying a UE configured with a partial coherent codebook subset (e.g., RRC parameter "codebookSubset"= "partialAndNonCoherent") by DCI for codebook-based transmission.

Moreover, in the present disclosure, the fully coherent codebook can be a codebook (i.e., codebooks of TPMIs=12 to 27 for single-layer transmission using four antenna ports) obtained by excluding codebooks corresponding to TPMIs specifying a UE configured with a partial coherent codebook subset (e.g., RRC parameter "codebookSubset"="partialAndNonCoherent") among codebooks (precoding matrix) corresponding to TPMIs specifying a UE configured with a fully coherent codebook subset (e.g., RRC parameter "codebookSubset"="fullyAndPartialAndNonCoherent") by DCI for codebook-based transmission.

(UE Capability or Full Power Transmission)

Even when the codebook is used, it is preferable to perform full power UL transmission appropriately. Therefore, in NR, the UE capability related to codebook-based full power UL transmission using a plurality of power amplifiers (PAs) has been studied. Discussions for NR so far has proposed UE capabilities 1 to 3, as follows:

UE capability 1: PAs that can output the maximum rated power (full rated PAs) are supported (included) on each transmission chain (Tx chain).
UE capability 2: no Tx chain supports full rated PA.
UE capability 3: subset a part) of Tx chains supports full rated PA.

Moreover, a UE having at least one of UE capabilities 1 to 3 can mean that the UE supports UL full power transmission. The UE can report capability information indicating that it supports the UL full power transmission capability to a network (e.g., a base station), addition to or apart from UE capabilities 1 to 3. The configuring of a UE supporting full power transmission can be made from the network.

The GE capability 1, 2, or 3 can be replaced with a full power transmission-related UE capability 1, 2, or 3, full power transmission type 1, 2, or 3, an electric power allocation type 1, 2, or 3, and so on. The terms of type, mode, capability, or the like herein can be used interchangeably. In addition, such numerals of 1, 2, or 3 herein can be used interchangeably as an optional set numerals or characters, such as A, B, or C.

Figure 2:
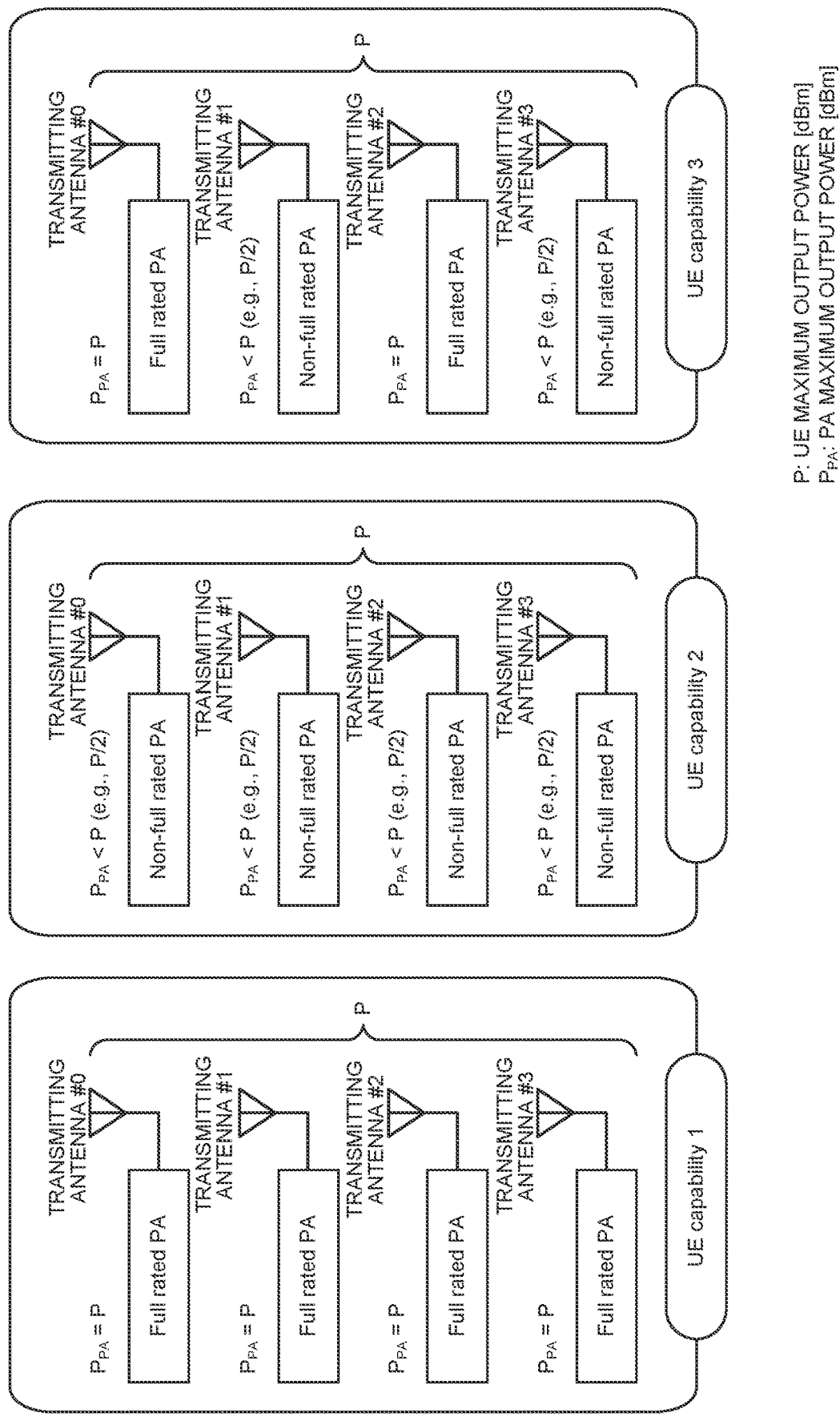
FIG. 2 is a diagram illustrating the exemplary configuration of UEs assuming the tall power transmission-related UE capabilities 1 to 3.

FIG. 2 is a diagram illustrating the exemplary configuration of UEs assuming the full power transmission-related UE capabilities 1 to 3. FIG. 2 illustrates in a simplified form only a PA and a transmitting antenna port (it can be replaced with a transmitting antenna) of the configuration of a UE. Moreover, this exemplary illustration shows that the number of PAs and the number of transmitting antenna ports are four, but not limited to this number.

Moreover, P indicates the UE maximum output power [dBm], and $P_{PA}$ indicates the PA maximum output power [dBm]. Furthermore, P can be, for example, 23 dBm for a UE with power class 3 and 26 dBm for a UE with power class 2. Although $P_{PA} \leq P$ is herein assumed, an embodiment of the present disclosure is applicable to a case of $P_{PA} > P$.

The configuration of UE capability 1 is expected to be costly to implement, but its full power transmission is possible using one or more optional antenna ports. The configuration of UE capability 2 includes only non-full rated PA and is expected to be implementable at a lower cost, but fails to perform the full power transmission using only one antenna port, so the phase, amplitude, or the like of the signal input to each PA is necessary to be controlled.

The configuration of UE capability 3 has a mixed form between the configuration of UE capability 1 and the configuration of UE capability 2. Antenna ports capable of full-power transmission (transmitting antennas #0 and #2 in this example) and antenna ports not capable of full-power transmission (transmitting antennas #1 and #3 in this example) are mixed.

Moreover, the index, number, or the like of antenna ports capable of full power transmission of UE capability 3 is not limited to this illustrated example. In addition, in this example, at is assumed that $P_{PA} = P/2$ of the non-full rated PA, but the value of $P_{PA}$ is not limited to this exemplary value.

Meanwhile, configuring a UE supporting UE capability 2 or 3 to operate in at least one of two modes (modes 1 and 2) for full power transmission has been considered. The modes 1 and 2 may be referred to as operation modes 1 and 2, respectively.

The mode a can herein be a mode in which a UE is configured so that one or more SRS resources included in one SRS resource set whose usage is "codebook" have the same number of SRS ports (e.g., also can be referred to as the first full power transmission mode). The UE operating in mode 1 can perform full power transmission using the entire antenna ports.

The UE operating mode can be configured by the network in such a way as to use a subset of TPMIs used to combine ports within one layer to achieve full power transmission. A new codebook subset can be introduced only for a rank value, which includes a TPMI precoder corresponding to "fullyAndPartialAndNonCoherent" defined in Rel-15 NR but is not available for full power transmission.

On the other hand, the mode 2 can herein be a mode in which a UE is configured so that one or more SRS resources included in one SRS resource set whose usage is "codebook" have the different number of SRS ports (e.g., also can be referred to as the second full power transmission mode). The US operating in mode 2 can perform full power transmission using not the entire antenna ports but a part of antenna ports.

The UE operating in mode 2 can transmit PUSCH and SRS in the same way regardless of the availability of antenna virtualization. The UE operating in mode 2 can be notified of a set of TPMIs to achieve full power transmission because of supporting more SRS resources than one port. In the case of mode 2, two or three SRS resources can be configured for each SRE resource set (up to two for Rel-15 NR).

Mode 1 has the advantage that the required SRI field size can be smaller than that of mode 2 (full power transmission is possible with one SRS resource).

None 2 has the advantage that single port transmission and multipart transmission are dynamically switchable by DCI compared to mode 1. In addition, full power transmission is achievable with some antenna ports, and so, for example, it is possible to perform full power transmission using only an antenna provided with a full rated PA or using only a coherent antenna.

Moreover, the UE can determine a mode to be used for PUSCH transmission on the basis of higher layer signaling (e.g., RRC signaling), physical layer signaling (e.g., DCI), or a combination thereof. In other words, the UE can be configured or indicated with a mode for PUSCH transmission.

In Rel-16 NR, a UE reporting UE capability information indicating support for operating in mode 1, reporting UE capability information indicating support for operating in mode 2, or reporting UE capability information regarding a TPMI set (also can be referred to as TPMI group) capable of full power transmission in relation to mode has been considered.

However, in the case where the UE supports both mode 1 and mode 2 and the case where it supports only one of mode 1 and mode 2, no consideration has been made on how the UE controls full power transmission (e.g., control of whether to perform full power transmission, control of power scaling for full power transmission, etc.).

The absence of explicit standards on matters described above makes UE unable to perform full power transmission properly. The inability to perform full power transmission may cause, for example, a decrease in coverage, which leads to difficulty in an increase in communication throughput.

Thus, the inventors have conceived a control method of appropriately performing full power transmission. According to one aspect of the present disclosure, it is possible to perform uplink multi-input multi-output (UL MIMO) transmission with full power, maintaining a cell coverage similar to a single antenna. In addition, according to UL MIMO, spatial diversity gain can be obtained, which can be expected throughput improvement. Furthermore, even a UE that is not provided with a full rated PA can appropriately perform full power transmission.

Hereinafter, embodiments according to the present disclosure will be described in detail with reference to the drawings. A radio communication method according to each embodiment may be applied independently, or may be applied in combination with others.

Moreover, the terms "antenna" and "antenna port" in embodiments below can be used interchangeably.

The term "full power" herein can be also replaced with "power boosting", "maximum power", "extended power", "power higher than that of Rel-15 UE", and the like.

Further, herein, the phrase "having UE capability X" (X=1, 2, or 3) can be also replaced with reporting UE capability X, performing full power transmission using the configuration of UE capability X, and the like.

The phrase "having coherent capability" (e.g., fully coherent, partial coherent, and non-coherent) can be also replaced herein with reporting the capability, being configured with coherent, and so on.

Further, a non-coherent ME, a partial coherent ME, and a fully coherent UE can be also replaced with a UK having capability relating to non-coherent, a UE having capability relating to partial coherent, and a ME having capability relating to fully coherent, respectively.

Further, the non-coherent UK, the partial coherent UK, and the fully coherent UE can refer to UEs in which codebook subsets of "nonCoherent", "partialAndNonCoherent", and "fullyAndPartialAndNonCoherent" are configured in the upper layer, respectively. Moreover, herein, "codebook subset" and "codebook" can be used interchangeably.

The non-coherent UE, the partial coherent UE, and the fully coherent UE can refer to UEs capable of transmitting using the non-coherent codebook, the partial coherent codebook, and the fully coherent codebook, respectively.

In the following respective embodiments, mode 1 or 2 is described as having a usage related to the SRS resource set of the codebook, but is not limited to this example. In the respective embodiments, modes 1 or 2 can be also replaced with, for example, mode 1 or 2 for SRS resource sets whose usage is non-codebook.

(Radio Communication Method)

First Embodiment

A first embodiment relates to a method of determining whether the PUSCH transmission for the antenna selection TPMI precoder is full power transmission or not.

The UE can determine whether or not the PUSH transmission for the antenna selection TPMI precoder full power transmission on the basis of a reported mode to be supported and a reported TPMI group. Moreover, in the case where the UE does not report the TPMI group, the phrase "reported TPMI group" can be herein replaced with "whether or not the TPMI group is reported".

[Case of Reporting Only One Mode by UE as a Mode to be Supported]

Even in the case where the UE supports both mode 1 and mode 2, it can be assumed that the UE reports only capability information representing that mode 1 is supported (hereinafter, also referred to as mode-1 capability information) or only capability information representing that mode 2 is supported (hereinafter, also referred to as mode-2 capability information) to the network.

The UE can assume that the operation at a given timing is based or only one of mode 1 and mode 2. This facilitates UE implementation.

The UE, when reporting the mode-1 capability information, may not necessarily transmit the capability information regarding the TPMI group (hereinafter, also referred to as TPMI group capability information).

It can be assumed that the UE transmits PUSCH at non-full power upon the use of the antenna selection TPMI precoder in reporting the mode-1 capability information.

It can be assumed that the UE transmits PUSCH at full power upon the use of a non-antenna selection TPMI precoder in reporting the mode-1 capability information.

FIG. 3 is a diagram illustrating an example of UE capability information in the case where the UE reports only one mode as a mode to be supported. FIG. 3 merely lists RRC parameter names, and the actual definition can be described using abstract syntax notation one (ASN.1) notation or the like. Moreover, the parameter name is not limited to the names shown.

The RRC parameter "supportedFullTxPowerUlTransmission" can show the capability representing whether or not to support full power UL transmission.

The RRC parameter "supportedFullTxPowerUlTransmissionMode1Mode2" can show the capability representing whether or not to support full power UL transmission based on either mode 1 or mode 2.

The RRC parameter "TpmiGroupForFullTxPowerUlTransmission" can represent the TPMI group capability information. The TPMI group capability information can represent a TPMI in which at least one of a non-coherent UE, a partially coherent UE, and a full coherent UE is capable of performing full power transmission using some ports for transmission using up to a certain number of ports.

A UE having UE capability 1 can report a value of "supportedFullTxPowerUlTransmission" having a value of supported ("supported").

A UE having UE capability 2 or 3, when reporting only mode-1 capability information, can report. "supportedFullTxPowerUlTransmissionMode1Mode2" in addition to "supportedFullTxPowerUlTransmission" or instead of "supportedFullTxPowerUlTransmission". The value of this "supportedFullTxPowerUlTransmissionMode1Mode2" can be "supported" or can be a value representing mode 1.

A UE having UE capability 2 or 3, when reporting only mode-2 capability information, can report "supportedFullTxPowerUlTransmissionMode1Mode2" and "TpmiGroupForFullTxPowerUlTransmission" in addition to "supportedFullTxPowerUlTransmission" or instead of "supportedFullTxPowerUlTransmission". The value of this "supportedFullTxPowerUlTransmissionMode1Mode2" can be "supported" or can be a value representing mode 2.

Note that the UE having UE capability 2 or 3, when reporting only mode-2 capability information, can report only "TpmiGroupForFullTxPowerUlTransmission" in addition to "supportedFullTxPowerUlTransmission" or instead of "supportedFullTxPowerUlTransmission".

[Case of Reporting Two Modes by UE as Mode to be Supported]

It can be assumed that the UN, when supporting both mode 1 and mode 2, reports the mode-1 capability information and the mode-2 capability information to the network. Moreover, the mode-1 capability information and the mode-2 capability information can be expressed as one piece of capability information.

There is a case where the UE reports the TPMI group capability information in reporting the mode-1 capability information and the mode-2 capability information if the mode configured or indicated from the network. In this case, it can be assumed that the UE transmits PUSCH at full power if the antenna selection precoder indicated by DCI is included in the TPMI group, and the UE transmits PUSCH at non-full power if the antenna selection precoder is not included in the TPMI group.

There is a case where the UE does not report the TPMI group capability information in reporting the mode-1 capability information and the mode-2 capability information if the mode 1 is configured or indicated from the network. In this case, it can be assumed that the UE transmits PUSCH at nor-full power for an antenna selection precoder indicated by DCI.

FIG. 4 is a diagram illustrating an example of UE capability information in a case where the UE reports two modes as a mode to be supported.

The RRC parameter "supportedFullTxPowerUlTransmission" can show the capability representing whether or not to support full power UL transmission.

The RRC parameter "supportedFullTxPowerUlTransmissionMode1" can show the capability representing whether or not to support full power UL transmission on the basis of the mode 1.

The RRC parameter "supportedFullTxPowerUlTransmissionMode2" can show the capability representing whether or not to support full power UE transmission on the basis of the mode 1.

The RRC parameter "TpmiGroupFullTxPowerUlTransmission" can represent the TPMI croup capability information.

A UE having UE capability 1 can report a value of "supportedFullTxPowerUlTransmission" having a value of "supported".

A UE having UE capability 2 or 3, when supporting the mode-1, can report "supportedFullTxPowerUlTransmissionMode1" having the value of "supported" in addition to "supportedFullTxPowerUlTransmission" or instead of "supportedFullTxPowerUlTransmission".

A UE having UE capability 2 or 3, when supporting the mode-2, can report. "supportedFullTxPowerUlTransmissionMode2" having the value of "supported" and "TpmiGroupForFullTxPowerUlTransmission" in addition to "supportedFullTxPowerUlTransmission" or instead of "supportedFullTxPowerUlTransmission".

A UE having UE capability 2 or 3, when supporting both the mode-1 and the mode-2, can report "supportedFullTxPowerUlTransmissionMode1" having the value of "supported", "supportedFullTxPowerUlTransmissionMode2" having the value of "supported", and "TpmiGroupForFullTxPowerUlTransmission" in addition to "supportedFullTxPowerUlTransmission" or instead of "supportedFullTxPowerUlTransmission".

According to the first embodiment described above, the UE is capable of reporting appropriately the capability regarding full power transmission to the network. Then, the network (base station) receiving the UE capability information is capable of scheduling the UE to appropriately perform the PUSCH transmission using the TPMI (or antenna port) capable of full power transmission.

Second Embodiment

A second embodiment relates to a method of determining a power scaling coefficient of the PUSCH transmission.

Moreover, the power scaling coefficient can mean a coefficient portion (e.g., "½" in the case of FIG. 1) that is multiplied by a matrix portion having elements with an absolute value of 1 in the precoding matrix corresponding to the TPMI indicated by DCI. The power scaling coefficient can also be referred to as a scaling value or the like.

The UE can determine the power scaling coefficient of the PUSCH transmission on the basis of a reported mode to be supported and a reported TPMI group. Moreover, in the case where the UE does not report the TPMI group, the phrase "reported TPMI group" can be herein replaced with "whether or not the TPMI group is reported".

The UE, when reporting the capability information representing that mode 1 is supported, can assume that the power scaling coefficient=$\sqrt{}$ (number of non-zero PUSGH antenna ports/maximum number of SRS ports to be supported). In this case, the power scaling coefficient can correspond to the same coefficient as Rel-15.

The non-zero PUSCH antenna port can herein mean an antenna port with non-zero PUSCH transmission power or an antenna port whose value is not zero (e.g., 1 or j) among the antenna ports whose transmission is represented by the precoding matrix (codebook subset).

Moreover, the phrase "maximum number of SRS ports supported" can be replaced with "maximum number of SRS ports supported by the US in a given SRS resource" and "number of SRS ports configured for (or associated with) the SRS resource indicated by SRT". Similar replacement between terms can hereinafter be applied.

The UE, when reporting the capability information representing that mode 2 is supported, can determine the power scaling coefficient on the basis of the reported TPMI group. In one example, if the TPMI indicated by DCI is included in the TPMI group, the power scaling coefficient is assumed to be 1, otherwise it can be assumed that the power scaling coefficient=$\sqrt{}$ (number of nonzero PUSCH antenna ports/ maximum number of SRS ports to be supported).

In the case where the UE reports the TPMI group capability information in reporting the capability information representing that both mode 1 and mode 2 are supported, the UE can determine the power scaling coefficient on the basis of the reported TPMI group. In one example, if the TPMI indicated by DCI is included in the TPMI group, the power scaling coefficient is assumed to be 1, otherwise it can be assumed that the power scaling coefficient=$\sqrt{}$ (number of nonzero PUSCH antenna ports/maximum number of SRS ports to be supported).

The UE, when reporting the capability information representing that both mode 1 and mode 2 are supported and not reporting TPMI group capability information, can assume that the power scaling coefficient=$\sqrt{}$ (number of non-zero PUSCH antenna ports/maximum number of SRS ports to be supported). In this case, the power scaling coefficient can correspond to the same coefficient as Rel-15.

The UE can apply the determined (or assumed) power scaling coefficient to the precoding matrix to transmit PUSCH at full power. In other words, the UE can transmit PUSH at full power by using a matrix obtained by multiplying the matrix portion of the precoding matrix by the power scaling coefficient.

Moreover, the power scaling coefficient can mean a ratio for scaling a linear value of the PUSCH transmission power determined on the basis of path loss or the like. In this case, the squared value of the power scaling coefficient described so far can correspond to the ratio. The UE can split the linear value of the PUSCH transmission power scaled using the ratio equally across the non-zero PUSCH antenna ports.

According to the second embodiment described above, even if both mode 1 and mode 2 are supported, it is possible for the UE to make any additional signaling unnecessary, determining the power scaling coefficient depending on the TPMI (and thus whether or not full power transmission is possible) indicated by DCI.

<Others>

Further, in the above-described embodiments, the description is given on the assumption of two modes but is not limited to this assumption. In one example, the two modes of the present disclosure can be replaced with three or more modes.

Further, in the above-described embodiments, the description is given on UL transmission using the antenna port assuming PUSCH, but the full power transmission of at least one of other signals and channels can be controlled in addition to or in place of PUSCH.

In other words, the antenna port in the above-described respective embodiments can be at least one antenna port of PUSCH (and demodulation reference signal (DMRS) and phase tracking reference signal (PTRS) for PUSCH), an uplink shared channel (physical uplink control channel (PUCCH)), a random access channel (physical random access channel (PRCH)), an SRS, or the like. The full power transmission can be applied to at least one of these signals and channels.

(Radio Communication System)

Hereinafter, a configuration of a radio communication system according to one embodiment of the present disclosure will be described. In this radio communication system, communication is performed using any one of the radio communication methods according to the embodiments of the present disclosure or a combination thereof.

Figure 5:
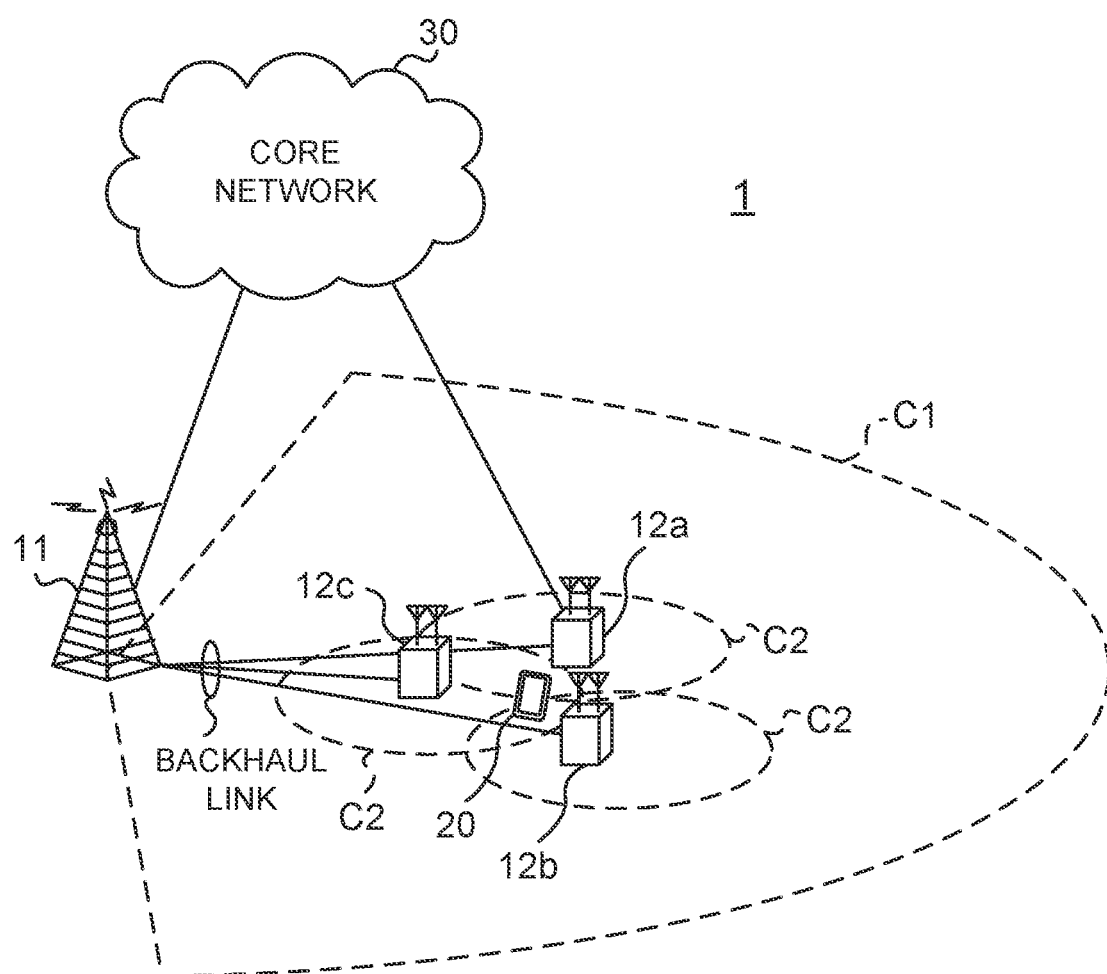
FIG. 5 illustrates one example or a schematic configuration of a radio communication system according to one embodiment.

FIG. 5 is a diagram illustrating an example of a schematic configuration of a radio communication system according to one embodiment. A radio communication system 1 may be a system that implements communication using long term evolution (LTE), 5th generation mobile communication system New Radio (5G NR), and the like drafted as the specification by third generation partnership project (3GPP).

Further, the radio communication system 1 may support dual connectivity (multi-RAT dual connectivity (MR-DC)) between a plurality of radio access technologies (RATs). The MR-DC may include dual connectivity between LTE (evolved universal terrestrial radio access (E-UTRA)) and NR (E-UTRA-NR dual connectivity (EN-DC)), dual connectivity between NR and LTE (NR-E-UTRA dual connectivity (NE-DC)), and the like.

In EN-DC, an LTE (E-UTRA) base station (eNB) is a master node (MN), and an NR base station (gNB) is a secondary node (SM). In NE-DC, an NR base station (gNB) is MN, and an LTE (E-UTRA) base station (eMB) is SN.

The radio communication system 1 may support dual connectivity between a plurality of base stations in the same RAT (for example, dual connectivity in which both MN and SN are NR base stations (gNBs) (NR-NR dual connectivity (NN-DC)).

The radio communication system 1 may include a base station 11 that forms a macro cell C1 with a relatively wide coverage, and base stations 12 (12a to 12c) that are arranged in the macro cell C1 and that form small cells C2 narrower than the macro cell C1. A user terminal 20 may be positioned in at least one cell. The arrangement, number, and the like of cells and the user terminals 20 are not limited to the aspects illustrated in the drawings. Hereinafter, the base stations 11 and 12 will be collectively referred to as base stations 10 unless specified otherwise.

The user terminal 20 may be connected to at least one of the plurality of base stations 10. The user terminal 20 may use at least one of carrier aggregation (CA) using a plurality of component carriers (CC) and dual connectivity (DC).

Each CC may be included in at least one of a first frequency range 1 (FR1) and a second frequency range 2 (FR2). The macro cell C1 may be included in FR1, and the small cell C2 may be included in FR2. For example, FR1 may be a frequency range of 6 GHz or less (sub-6 GHz), and FR2 may be a frequency range higher than 24 GHz (above-24 GHz). Note that the frequency ranges, definitions, and the like of FR1 and FR2 are not limited to these, and for example, FR1 may be a frequency range higher than FR2.

Further, the user terminal 20 may perform communication on each CC using at least one of time division duplex (TDD) or frequency division duplex (FDD).

The plurality of base stations 10 may be connected by wire (for example, an optical fiber or an X2 interface in compliance with common public radio interface (CPRI)) or by radio (for example, NR communication). For example, when NR communication is used as a backhaul between the base stations 11 and 12, the base station 11 corresponding to a higher-level station may be referred to as an integrated access backhaul (LAB) donor, and the base station 12 corresponding to a relay station (relay) may be referred to as an LAB node.

A base station 10 may be connected to a core network 30 via another base station 10' or directly. The core network 30 may include, for example, at least one of evolved packet core (EPC), 5G core network (5GCN), next generation core (NGC), and the like.

The user terminal 20 may be a terminal corresponding to at least one of communication methods such as LTE, LTE-A, and 5G.

In the radio communication system 1, a radio access method based on orthogonal frequency division multiplexing (OFDM) may be used. For example, in at least one of downlink (DL) and unlink (UL), cyclic prefix OFDM (CP-OFDM), discrete Fourier transform spread OFDM (DFT-s-OFDM), orthogonal frequency division multiple access (OFDMA), single carrier frequency division multiple access (SC-FDMA), and the like may be used.

The radio access method may be referred to as a waveform. Note that, in the radio communication system 1, another radio access method (for example, another single carrier transmission method and another multi-carrier transmission method) may be used as UL and DL radio access methods.

In the radio communication system 1, as a downlink channel, a downlink shared channel (a physical downlink shared channel (PDSCH)) shared by each user terminal 20, a broadcast channel (a physical broadcast channel (PBCH)), a downlink control channel (a physical downlink control channel (PDCCH)), or the like may be used.

In the radio communication system 1, an uplink shared channel (physical uplink shared channel (PUSCH)) shared by each user terminal 20, an uplink control channel (physical uplink control channel (PUCCH)), a random access channel (physical random access channel (PRACH)), and the like may be used as uplink channels.

User data, higher layer control information, and a system information block (SIB) and the like are transmitted by the PDSCH. The PUSCH may transmit user data, higher layer control information, and the like. Further, the PBCH may transmit a master information block (MIB).

Lower layer control information may be transmitted by PDCCH. The lower layer control information may include, for example, downlink control information (DCI) including scheduling information of at least one of the PDSCH and the PUSCH.

Note that, the DCI for scheduling the PDSCH may be referred to as DL assignment, DL DCI, and the like, and the DCI for scheduling the PUSCH may be referred to as UL grant, UL DCI, and the like. Note that PDSCH may be replaced with DL data, and PUSCH may be replaced with UL data.

A control resource set (CORESNT) and a search space may be used to detect the PDCCH. The CORESET corresponds to a resource that searches for DCI. The search space corresponds to a search area and a search method for PDCCH candidates. One CORESET may be associated with one or a plurality of search spaces. The UE may monitor CORESET associated with a certain search space on the basis of search space configuration.

One search space may correspond to a PDCCH candidate corresponding to one or a plurality of aggregation levels. One or a plurality of search spaces may be referred to as a search space set. Note that "search space", "search space set", "search space configuration", "search space set configuration", "CORESET", "CORESET configuration", and the like in the present disclosure may be replaced with each other.

Uplink control information (UCI) including at least one of channel state information (CSI), delivery confirmation information (which may be referred to as, for example, hybrid automatic repeat request acknowledgement (HARQ-ACID), ACK/NACK, or the like), scheduling request (SR), or the like may be transmitted on the PUCCH. A random access preamble for establishing a connection with a cell may be transmitted on PRACH.

Note that in the present disclosure, downlink, uplink, and the like may be expressed without "link". Furthermore, various channels may be expressed without "physical" at the beginning thereof.

In the radio communication system 1, a synchronization signal (SS), a downlink reference signal (DL-RS), and the like may be transmitted. In the radio communication systems 1, a cell-specific reference signal (CRS), a channel state information reference signal (CSI-RS), a demodulation reference signal (DMRS), a positioning reference signal (PRS), a phase tracking reference signal (PTRS), and the like may be transmitted as the DL-RS.

The synchronization signal may be at least one of, for example, a primary synchronization signal (PSS) and a secondary synchronization signal (SSS). A signal block including the SS (PSS, SSS) and the PBCH (and the DMRS for the PBCH) may be referred to as an SS/PBCH block, an SS block (SSB), and the like. Note that the SS, the SSB, or the like may also be referred to as a reference signal.

In the radio communication system 1, a sounding reference signal (SRS), a demodulation reference signal (DMRS), and the like may be transmitted as an uplink reference signal (UL-RS). Note that, DMRSs may be referred to as "user terminal-specific reference signals (UE-specific Reference Signals)."

(Base Station)

Figure 6:
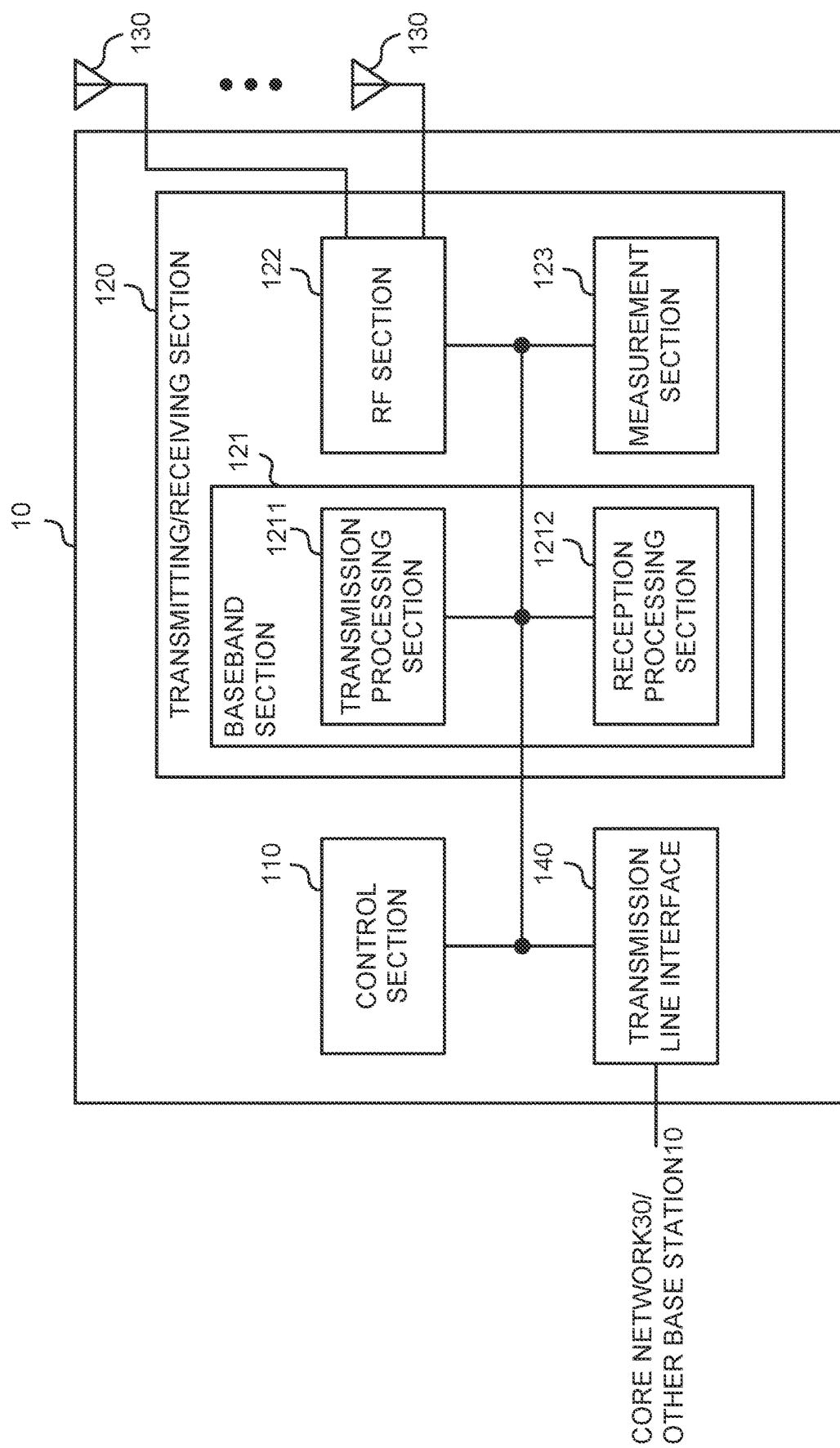
FIG. 6 illustrates one example of the configuration of a base station according to one embodiment.

FIG. 6 illustrates one example of the configuration base station according to one embodiment. The base station 10 includes a control section 110, a transmitting/receiving section 120, a transmission/reception antenna 130, and a transmission line interface 140. Note that one or more of the control sections 110, one or more of the transmitting/receiving sections 120, one or more of the transmission/reception antennas 130, and one or more of the transmission line interfaces 140 may be provided.

Note that, although this example will primarily illustrate functional blocks that pertain to characteristic parts of the present embodiment, it may be assumed that the base station 10 has other functional blocks that are necessary for radio communication as well. A part of processing of each section described below may be omitted.

The control section 110 controls the entire base station 10. The control section 110 can include controller, a control circuit, or the like, which is described on the basis of common recognition in the technical field to which the present disclosure relates.

The control section 110 may control sig gal generator scheduling (for example, resource allocation or mapping), and the like. The control section 110 may control transmission/reception, measurement, and the like using the transmitting/receiving section 120, the transmission/reception antenna 130, and the transmission line interface 140. The control section 110 may generate data to be forwarded as a signal, control information, a sequence, and the like, and may transfer the data, the control information, the sequence, and the like to the transmitting/receiving section 120. The control section 110 may perform call processing (such as configuration or release; of a communication channel, management of the state of the base station 10, and management of a radio resource.

The transmitting/receiving section 120 may include a baseband section 121, a radio frequency (RF) section 122, and a measurement section 123. The baseband section 121 may include a transmission processing section 1211 and a reception processing section 1212. The transmitting/receiving section 120 can be implemented by a transmitter/receiver, an RF circuit, a baseband circuit, a filter, a phase shifter, a measurement circuit, a transmission/reception circuit, and the like, which are described on the basis of common recognition in the technical related to the present disclosure.

The transmitting/receiving section 120 may be configured as an integrated transmitting/receiving section, or may include a transmission section and a reception section. The transmission section may be configured by the transmission processing section 1211 and the RF section 122. The reception section may include the reception processing section 1212, the RF section 122, and the measurement section 123.

The transmission/reception antenna 130 can be implemented by an antenna described on the basis of common recognition in the technical field related to the present disclosure, for example, an array antenna.

The transmitting/receiving section 120 may transmit the above-described downlink channel, synchronization signal, downlink reference signal, and the like. The transmitting/receiving section 120 may receive the above-described uplink channel, uplink reference signal, and the like.

The transmitting/receiving section 120 may form at least one of a Tx beam and a reception beam by using digital beam forming (for example, precoding), analog beam forming (for example, phase rotation), and the like.

The transmitting/receiving section 120 (transmission processing section 1211) may perform packet data convergence protocol (PDCP) layer processing, radio link control (RLC) layer processing (for example, RLC retransmission control), medium access control (MAC) layer processing (for example, HARQ retransmission control), and the like, for example, on data or control information acquired from the control section 110 to generate a bit string to be transmitted.

The transmitting/receiving section 120 (transmission processing section 1211) may perform transmission processing such as channel encoding (which may include error correcting encoding), modulation, mapping, filtering processing, discrete Fourier transform (DFT) processing (if necessary), inverse fast Fourier transform (IFFT) processing, precoding, or digital-analog transform on the bit string to be transmitted, and may output a base band signal.

The transmitting/receiving section 120 (RF section 122) may perform modulation to a radio frequency range, filtering processing, amplification, and the like on the base band signal, to transmit a signal in the radio frequency range via the transmission/reception antenna 130.

Meanwhile, the transmitting/receiving section 120 (RF section 122) may perform amplification, filtering processing, demodulation to a base band signal, and the like on the signal in the radio frequency band received by the transmission/reception antenna 130.

The transmitting/receiving section 120 (reception processing section 1212) may apply reception processing such as analog-digital transform, fast Fourier transform (FFT) processing, inverse discrete Fourier transform (IDFT) processing (if necessary), filtering processing, demapping, demodulation, decoding (which may include error correcting decoding), MAC layer processing, RLC layer processing, and PDCP layer processing on the acquired base band signal to acquire user data and the like.

The transmitting/receiving section 120 (measurement section 123) may perform measurement on the received signal. For example, the measurement section 123 may perform radio resource management (RRM) measurement, channel state information (CSI) measurement and the like on the basis of the received signal. The measurement section 123 may measure received power (for example, reference signal received power (RSRP)), received quality (for example, reference signal received quality (RSRQ), a signal to interference plus noise ratio (SINR), or a signal to noise ratio (SNR)), signal strength (for example, received signal strength indicator (RSSI)), propagation path information (for example, CSI), and the like. The measurement result may be output to the control section 110.

The transmission line interface 140 may transmit/receive a signal (backhaul signaling) to and from an apparatus included in the core network 30, other base stations 10, and the like, and may acquire, transmit, and the like user data (user plane data), control plane data, and the like for the user terminal 20.

Note that the transmission section and the reception section of the base station 10 in the present disclosure may include at least one of the transmitting/receiving section 120, the transmission/reception antenna 130, and the transmission line interface 140.

Moreover, the transmitting/receiving section 120 can receive, from the user terminal 20, at least one of capability information representing a mode for full power transmission to be supported (e.g., mode 1 or 2) and capability information representing a group of transmitted precoding matrix indicators (TPMIs) that support full power transmission.

(User Terminal)

Figure 7:
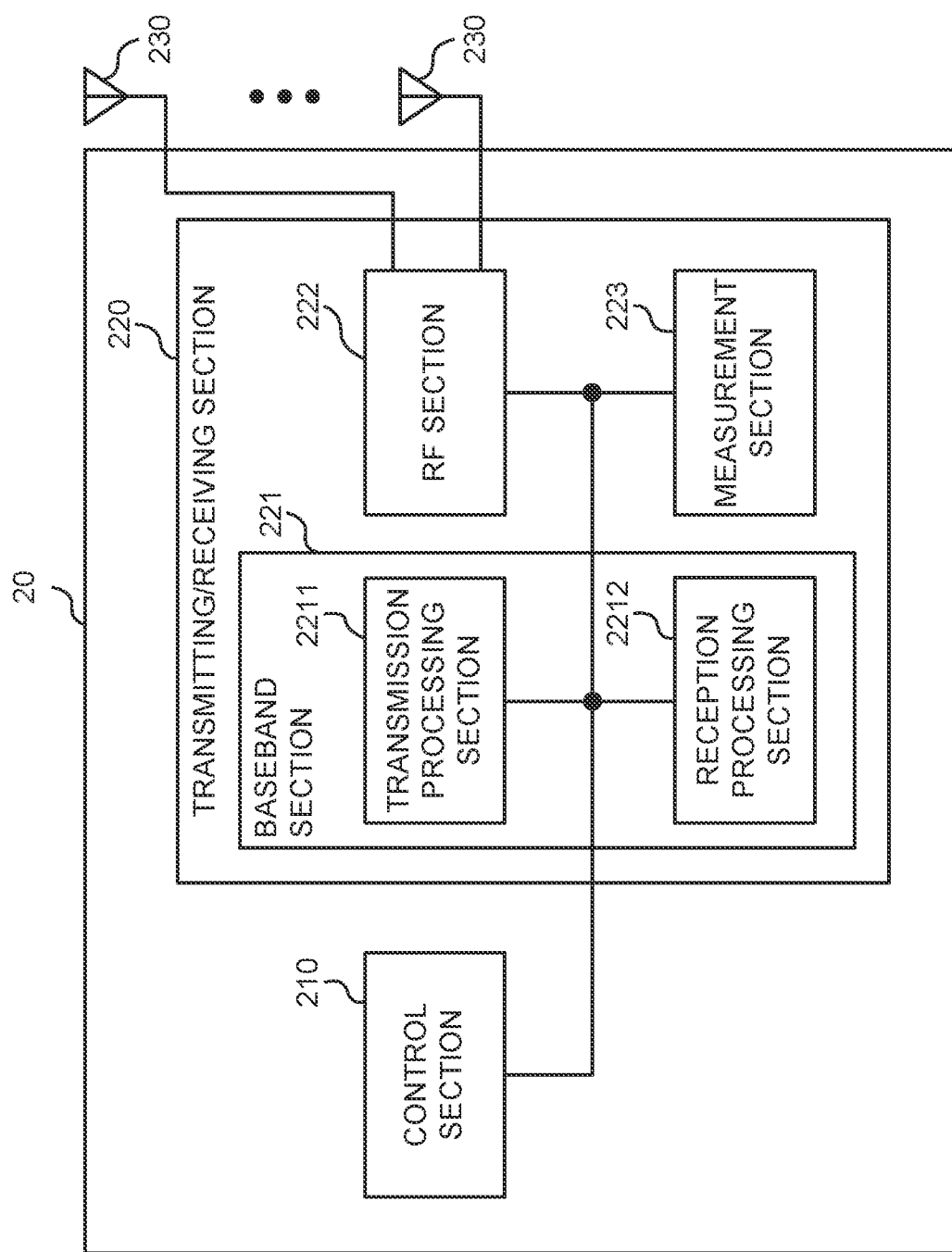
FIG. 7 illustrates one example of the configuration of a user terminal according to one embodiment.

FIG. 7 illustrates one example of the configuration of a user terminal according to one embodiment. The user terminal 20 includes a control section 210, a transmitting/receiving, section 220, and a transmission/reception antenna 230. Note that one or more of the control sections 210, one or more of the transmitting/receiving sections 220, and one or more of the transmission/reception antennas 230 may be included.

Note that, although this example mainly describes functional blocks of a characteristic part of the present embodiment, it may be assumed that the user terminal 20 includes other functional blocks that are necessary for radio communication as well. A part of processing of each section described below may be omitted.

The control section 210 controls the entire user terminal 20. The control section 210 can include a controller, a control circuit, or the like, which is described on the basis of common recognition in the technical field to which the present disclosure relates.

The control section 210 may control signal generation, mapping, and the like. The control section 210 may control transmission/reception, measurement, and the like using the transmitting/receiving section 220 and the transmission/reception antenna 230. The control section 210 may generate data to be forwarded as a signal, control information, a sequence, and the like, and may transfer the data, the control information, the sequence, and the like to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can include a transmitter/receiver, an RF circuit, a baseband circuit, a filter, a phase shifter, measurement circuit, a transmission/reception circuit, or the like, which is described on the basis of common recognition in the technical field to which the present disclosure relates.

The transmitting/receiving section 220 may be configured as an integrated transmitting/receiving section, or may include a transmission section and a reception section. The transmission section may be configured by the transmission processing section 2211 and the RF section 222. The reception section may include the reception processing section 2212, the RF section 222, and the measurement section 223.

The transmission/reception antenna 230 can include an antenna, which is described on the basis of common recognition in the technical field to which the present disclosure relates, for example, an array antenna.

The transmitting/receiving section 220 may receive the above-described downlink channel, synchronization signal, downlink reference signal, and the like. The transmitting/receiving section 220 may transmit the above-described uplink channel, uplink reference signal, and the like.

The transmitting/receiving section 220 may form at least one of a Tx beam and a reception beam by using digital beam forming (for example, precoding), analog beam forming (for example, phase rotation), and the like.

The transmitting/receiving section 220 (transmission processing section 2211) may perform PDCP layer processing, RLC layer processing (for example, RLC retransmission control), MAC layer processing (for example, HARQ retransmission control), and the like, for example, on data acquired from the control section 210 or control information to generate a bit string to be transmitted.

The transmitting/receiving section 220 (transmission processing section 2211) may perform transmission processing such as channel encoding (which may include error correcting encoding), modulation, mapping, filtering processing, DFT processing (if necessary), IFFT processing, precoding, or digital-analog transform on a bit string to be transmitted, and may output a base band signal.

Note that whether or not to apply DFT processing may be determined on the basis of configuration of transform preceding. When transform preceding is enabled for a channel (for example, PUSCH), the transmitting/receiving section 220 (transmission processing section 2211) may perform DFT processing as the above-described transmission processing in order to transmit the channel by using a DFT-s-OFDM waveform, and if not, the DFT processing does not have to be performed as the transmission processing.

The transmitting/receiving section 220 (RF section 222) may perform modulation to a radio frequency band, filtering processing, amplification, and the like on the base band signal, and may transmit a signal in the radio frequency band via the transmission/reception antenna 230.

Meanwhile, the transmitting/receiving section 220 (RF section 222) may perform amplification, filtering processing, demodulation to a base band signal, and the like on the signal in the radio frequency band received by the transmission/reception antenna 230.

The transmitting/receiving section 220 (reception processing, section 2212) may apply reception processing such as analog-digital transform, FFT processing, IDFT processing (if necessary), filtering processing, demapping, demodulation, decoding (which may include error correcting decoding), MAC layer processing, RLC layer processing, or PDCP layer processing on the acquired base band signal to acquire user data and the like.

The transmitting/receiving section 220 (measurement section 223) may perform measurement on the received signal. For example, the measurement section 223 may perform RRM measurement, CSI measurement, and the like on the basis of the received signal. The measurement section 223 may measure received power (for example, RSRP), received quality (for example, RSRQ, SINR, or SNR), signal strength (for example, RSSI), propagation path information (for example, CSI), and the like. A measurement result may be output to the control section 210.

Note that the transmission section and the reception section of the user terminal 20 in the present disclosure may include at least one of the transmitting/receiving section 220 and the transmission/reception antenna 230.

Moreover, the control section 210 can determine whether or not to perform the uplink shared channel (PUSCH) transmission for the antenna selection TPMI precoder at full power on the basis of the reported full power transmission mode (e.g., mode 1 or 2)) to be supported and the reported transmitted precoding matrix indicator (TPMI) group.

The transmitting/receiving section 220 can transmit the uplink shared channel transmission using the antenna selection TPMI precoder.

The transmitting/receiving section 220 may transmit, even in a case where both mode 1 and mode 2 are supported, only capability information representing that the mode supported or only capability information representing that the mode 2 is supported to a network (base station 10).

The control section 210 may determine, in a case where only the capability information representing that the mode 1 is supported is transmitted to the network, to perform the uplink shared channel transmission for the antenna selection TPMI precoder at non-full power, and to perform the uplink shared channel transmission for no antenna selection TPMI precoder at full power.

The transmitting/receiving section 220 may transmit in a case where both mode 1 and mode 2 are supported, both of the capability information representing that the mode is supported and the capability information representing that the mode 2 is supported to the network (base station 10).

The control section 210 may determine, when the mode 1 is configured or indicated, to perform the uplink shared channel transmission for the antenna selection TPMI precoder at full power in a case where the antenna selection precoder indicated by downlink control information (DCI) is included in the TPMI group, and to perform the uplink shared channel transmission for the antenna selection TPMI precoder at non-full power in any other cases.

(Hardware Configuration)

Note that the block diagrams that have been used to describe the above embodiments illustrate blocks in functional units. These functional blocks (configuration units) may be implemented in arbitrary combinations of at least one of hardware or software. Further, the method for implementing each functional block is not particularly limited. That is, each functional block may be implemented by a single apparatus physically or logically aggregated, or may be implemented by directly or indirectly connecting two or more physically or logically separate apparatuses (using wire, radio, or the like, for example) and using these apparatuses. The functional blocks may be implemented by combining software with the above-described single apparatus or the above-described plurality of apparatuses.

Here, the function includes, but is not limited to, deciding, determining, judging, calculating, computing, processing, deriving, investigating, searching, ascertaining, receiving, transmitting, outputting, accessing, solving, selecting, choosing, establishing, comparing, assuming, expecting, considering, broadcasting, notifying, communicating, forwarding, configuring, reconfiguring, allocating, mapping, and assigning. For example, a functional block (configuration unit) that causes transmission to function may be referred to as a transmitting unit, a transmitter, and the like. In any case, as described above, the implementation method is not particularly limited.

Figure 8:
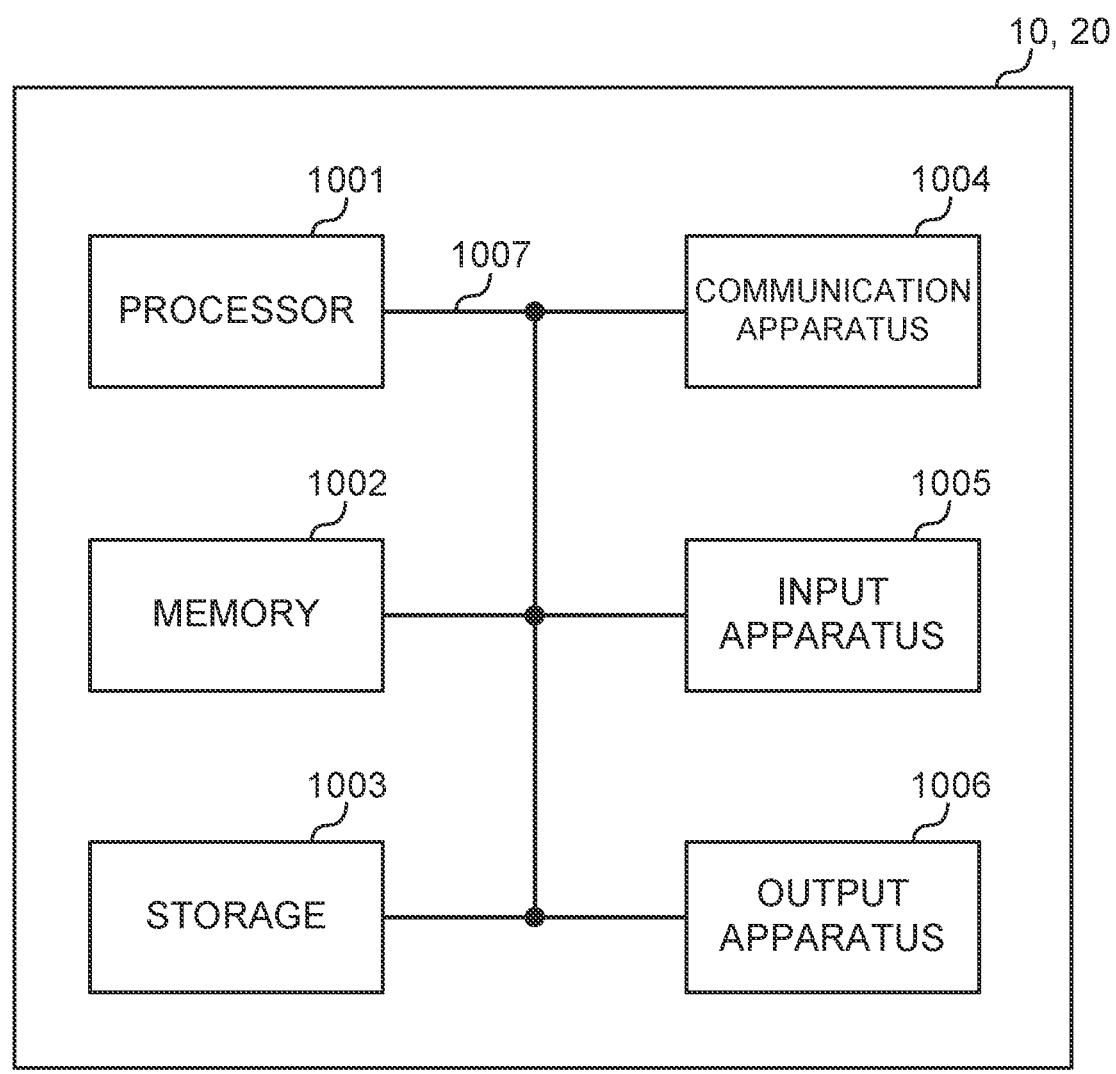
FIG. 8 illustrates one example of the hardware configuration of the base station and the user terminal according to one embodiment.

For example, the base station, the user terminal, or the like according to one embodiment of the present disclosure may function as a computer that executes processing a radio communication method in the present disclosure. FIG. 8 illustrates one example of the hardware configuration of the base station and the user terminal according to one embodiment. Physically, the above-described base station 10 and user terminal 20 may be formed as a computer apparatus that includes a processor 1001, a memory 1002, a storage 1003, a communication apparatus 1004, an input apparatus 1005, an output apparatus 1006, a bus 1007, and the like.

Note that in the present disclosure, the terms such as an apparatus, a circuit, a device, a section, and a unit can be replaced with each other. The hardware configuration of the base station 10 and the user terminal 20 may include one or a plurality of apparatuses illustrated in the figure, or does not have to include some apparatuses.

For example, although only one processor 1001 is illustrated, a plurality of processors may be provided. Further, the processing may be executed by one processor, or the processing may be executed in sequence or using other different methods by two or more processors. Note that the processor 1001 may be implemented by one or more chips.

Each of functions of the base station 10 and the user terminal 20 implemented by, for example, the processor 1001 executing an operation by reading predetermined software (program) on hardware such as the processor 1001 or the memory 1002, controlling communication via the communication apparatus 1004, and controlling at least one of reading or writing of data in the memory 1002 and the storage 1003.

The processor 1001 may control the entire computer by, for example, causing an operating system to be operated. The processor 1001 may be configured by a central processing unit (CPU) including an interface with peripheral equipment, a control apparatus, an operation apparatus, a register, and the like. For example, at least a part of the above-described control section 110 (210), transmitting/receiving section 120 (220), or the like may be implemented by the processor 1001.

Further, the processor 1001 reads programs (program codes), software modules, or data, from at least one of the storage 1003 or the communication apparatus 1004, into the memory 1002, and executes various types of processing in accordance with these. As the program, a program to cause a computer to execute at least a part of the operation described in the above-described embodiment is used. For example, the control section 110 (210) may be implemented by a control program that is stored in the memory 1002 and operates in the processor 1001, and other functional blocks may be implemented similarly.

The memory 1002 is a computer-readable recording medium, and may include, for example, at least one of a read only memory (ROM), an erasable programmable ROM (EPROM), an electrically EPROM (EEPROM), a random access memory (RAM) and/or other appropriate storage media. The memory 1002 may be referred to as a register, a cache, a main memory (primary storage apparatus), and the like. The memory 1002 can store programs (program codes), software modules, and the like that are executable for implementing the radio communication method according to one embodiment of the present disclosure.

The storage 1003 is a computer-readable recording medium, and may include, for example, at least one of a flexible disk, a floppy (registered trademark) disk a magneto-optical disk (for example, a compact disc ROM (CD-ROM) and the like), a digital versatile disc, a Blu-ray (registered trademark) disk), a removable disk, a hard disk drive, a smart card, a flash memory device (for example, a card, a stick, a key drive), a magnetic stripe, a database, a server, and other appropriate storage media. The storage 1003 may be referred to as an auxiliary storage apparatus.

The communication apparatus 1004 is hardware (transmission/reception device) for performing inter-computer communication through at least one of a wired network or a radio network, and may be referred to as, for example, a network device, a network controller, a network card, a communication module, and the like. The communication apparatus 1004 may include a high frequency switch, a duplexer, a filter, a frequency synthesizer, and the like in order to implement, for example, at least one of frequency division duplex (FDD) and time division duplex (TDD). For example, the transmitting/receiving section 120 (220), the transmission/reception antenna 130 (230), and the like described above may be implemented by the communication apparatus 1004. In the transmitting/receiving section 120 (220), implementation may be made in which a transmission section 120*a* (220*a*) and a reception section 120*b* (220*b*) are separated from each other physically or logically.

The input apparatus 1005 is an input device that receives input from the outside (for example, a keyboard, a mouse, a microphone, a switch, a button, a sensor, or the like). The output apparatus 1006 is an output device that performs output to the outside (for example, a display, a speaker, a light emitting diode (LED) lamp, and the like). Note that the input apparatus 1005 and the output apparatus 1006 may be provided in an integrated configuration (for example, a touch panel).

Further, these apparatuses such as the processor 1001 and the memory 1002 are connected to each other by the bus 1007 to communicate information. The bus 1007 may be formed with a single bus, or may be formed with different buses for respective connections between the apparatuses.

Further, the base station 10 and the user terminal 20 may include hardware such as a microprocessor, a digital signal processor (DSP), an application specific integrated circuit (ASIC), a programmable logic device (PLD), or a field programmable gate array (FPGA), and some or all of the functional blocks may be implemented by the hardware. For example, the processor 1001 may be implemented by at least one of these pieces of hardware.

(Variations)

Note that terms described in the present disclosure and terms necessary for understanding the present disclosure may be replaced with terms that have the same or similar meanings. For example, a channel, a symbol, and a signal (signal or signaling) may be replaced interchangeably. Further, the signal may be a message. The reference signal can be abbreviated as an RS, and may be referred to as a pilot, a pilot signal, and the like, depending on which standard applies. Further, a component carrier (CC) may be referred to as a cell, a frequency carrier, a carrier frequency, and the like.

A radio frame may include one or a plurality of periods (frames) in the time domain. Each of the one or plurality of periods (frames) included in the radio frame may be referred to as a subframe. Further, the subframe may include one or a plurality of slots in the time domain. The subframe may be a fixed time length (for example, 1 ms) that is not dependent on numerology.

Here, the numerology may be a communication parameter applied to at least one of transmission or reception of a certain signal or channel. The numerology may indicate at least one of, for example, a subcarrier spacing (SCS), a bandwidth, a symbol length, a cyclic prefix length, a transmission time interval (TTI), the number of symbols per TTI, a radio frame configuration, specific filtering processing performed by a transceiver in the frequency domain, and a specific windowing processing performed by the transceiver in the time domain.

A slot may include one or a plurality of symbols in the time domain (orthogonal frequency division multiplexing (OFDM) symbols, single carrier frequency division multiple access (SC-FDMA) symbols, and the like). Further, the slot may be a time unit based on the numerology.

The slot may include a plurality of mini slots. Each mini slot may include one or a plurality of symbols in the time domain. Further, the mini slot may be referred to as a sub slot. Each mini slot may include fewer symbols than a slot. PDSCH (or PUSCH) transmitted in a time unit larger than a slot may be referred to as PDSCH (PUSCH) mapping type A. A PDSCH (or PUSCH) transmitted using, a mini slot may be referred to as a PDSCH (PUSCH) mapping type B.

The radio frame, subframe, slot, mini slot, and symbol all represent the time unit in signal communication. The radio frame, the subframe, the slot, the mini slot, and the symbol may be called by other applicable names, respectively. Note that time units such as the frame, subframe, slot, mini slot, and symbol in the present disclosure may be replaced with each other.

For example, one subframe may be referred to as a TTI, a plurality of consecutive subframes may be referred to as a TTI, or one slot or one mini slot may be referred to as a TTI. That is, at least one of the subframe and TTI may be a subframe (1 ms) in the existing LTE, may be a period shorter than 1 ms (for example, one to thirteen symbols), or may be a period longer than 1 ms. Note that a unit to represent a TTI may be referred to as a slot, a mini slot, or the like, instead of a subframe.

Here, the TTI refers to the min mum time unit of scheduling in radio communication, for example. For example, in the LTE system, a base station performs scheduling to allocate radio resources (a frequency bandwidth and transmission power that can be used in each user terminal and the like) to each user terminal in TTI units. Note that a definition of the TTI is not limited thereto.

The TTI may be a transmission time unit of a channel-encoded data packet (transport block), a code block, a codeword, or the like, or may be a processing unit of scheduling, link adaptation, or the like. Note that when the TTI is given, a time interval (for example, the number of symbols) to which the transport block, code block, codeword, or the like is actually mapped may be shorter than the TTI.

Note that in a case where one slot or one mini slot is referred to as a TTI, one or more TTIs (that is, one or more slots or one or more mini slots) may be the minimum time unit of scheduling. Further, the number of slots (the number of mini slots) constituting the minimum time unit of the scheduling may be controlled.

A TTI having a time length of 1 ms may be referred to as a usual TTI (TTI in 3GPP Rel. 8 to 12), a normal TTI, a long TTI, a usual subframe, a normal subframe, a long subframe, a slot, and the like. A TTI shorter than the usual TTI may be referred to as a shortened TTI, a short TTI, a partial TTI (or fractional TTI), a shortened subframe, a short subframe, a mini slot, a sub-slot, a slot, or the like.

Note that the long TTI (for example, the usual TTI, subframe, or the like) may be replaced with a III having a time length exceeding 1 ms, and the short TTI (for example, the shortened TTI or the like) may be replaced with a TTI having a TTI length less than the TTI length of the long TTI and not less than 1 ms.

A resource block (RB) is a resource allocation unit in the time domain and the frequency domain, and may include one or a plurality of consecutive subcarriers in the frequency domain. The number of subcarriers included in the RE may be the same regardless of the numerology, and may be twelve, for example. The number of subcarriers included in the RB may be determined on the basis of the numerology.

Further, the RE may include one or a plurality of symbols in the time domain, and may be one slot, one mini slot, one subframe or one TTI in length. One TTI, one subframe, and the like each may include one or a plurality of resource blocks.

Note that one or a plurality of RBs may be referred to as a physical resource block (physical RB (PRB)), a subcarrier group (SCG), a resource element group (REG), a PRB pair, an RB pair, or the like.

Further, the resource block may include one or a plurality of resource elements (REs). For example, one RE may be a radio resource area of one subcarrier and one symbol.

A bandwidth part (BWP) (which may be referred to as a partial bandwidth or the like) may represent a subset of consecutive common resource blocks (RBs) for certain numerology in a certain carrier. Here, the common RB may be indicated by the index of the RB based on a common reference point of the carrier. The PRE may be defined in a certain BWP and be numbered within the BWP.

The BWP may include a BWP for UL (UL BWP) and a BWP for DL (DL BWP). For the UE, one or a plurality of BWPs may be configured within one carrier.

At least one of the configured BWPs may be active, and the UE does not have to assume to transmit and receive a predetermined signal/channel outside the active BWP. Note that "cell", "carrier", or the like in the present disclosure may be replaced with "BWP".

Note that structures of the radio frame, subframe, slot, mini slot, symbol, and the like described above are merely examples. For example, configurations such as the number of subframes included in the radio frame, the number of slots per subframe or radio frame, the number of mini slots included in the slot, the number of symbols and RBs included in the slot or mini slot, the number of subcarriers included in the RB, the number of symbols in the TTI, the symbol length, the cyclic prefix (CP) length, and the like can be variously changed.

Further, the information, parameters, and the like described in the present disclosure may be represented by using absolute values, may be represented by using relative values with respect to predetermined values, or may be represented by using, other corresponding information. For example, the radio resource may be indicated by a predetermined index.

Names used for the parameters and the like in the present disclosure are not restrictive names in any respect. Further, any mathematical expression or the like that uses these parameters may differ from those explicitly disclosed in the present disclosure. Since various channels (PUCCH, PDCCH, and the like) and information elements can be identified by any suitable names, various names assigned to these various channels and information elements are not restrictive names in any respect.

The information, signals, and the like described in the present disclosure may be represent d by using any of a various different technologies. For example, data an instruction, a command, information, a signal, a bit, a symbol, a chip, and the like that can be referenced throughout the above description may be represented by a voltage, a current, an electromagnetic wave, a magnetic field or a magnetic particle, an optical field or a photon, or any combination of these.

Further, the information, signals, and the like can be output in at least one of a direction from higher layers to lower layers or a direction from lower layers to higher layers. The information, signals, and the like may be input and output via plurality of network nodes.

The information, signals, and the like that are input and/or output may be stored in a specific location (for example, in a memory), or may be managed with management table. The information, signal, and the like to be input and output can be overwritten, updated or appended. The output information, signal, and the like may be deleted. The information, signals, and the like that are input may be transmitted to other apparatuses.

Notification of information may be performed not only by using the aspects/embodiments described in the present disclosure but also by using another method. For example, notification of information in the present disclosure may be performed by using physical layer signaling (for example, downlink control information (DCI), uplink control information (UCI)), higher layer signaling (for example, radio resource control (RRC) signaling, broadcast information (master information block (MTB), system information block (SIB), or the like), medium access control (MAC) signaling), another signal, or a combination thereof.

Note that physical layer signaling may be referred to as Layer 1/Layer 2 (L1/L2) control information (L1/L2 control signals), L1 control information (L1 control signal), or the like. Further, the RRC signaling may be referred to as an RRC message, and may be, for example, an RRC connection setup message, an RRC connection reconfiguration message, and the like. Further, notification of the MAC signaling may be given by using, for example, a MAC control element (MAC control element (CE)).

Further, notification of predetermined information (for example, notification of information to the effect that "X holds") is not limited to an explicit notification, and may be made implicitly (for example, by not making the predetermined notification, or by notification of other information).

Judging may be made in values represented by one bit (0 or 1), may be made in Boolean values that represent true or false, or may be made by comparing numerical values (for example, comparison with a predetermined value).

Regardless of being referred to as software, firmware, middleware, a microcode, or a hardware description language, or being referred to as another name, software should be interpreted broadly, to mean an instruction, an instruction set, a code, a code segment, a program code, a program, subprogram, a software module an application, a software application, software package, a routine, a subroutine, an object, an executable file, an execution thread, a procedure, a function, and the like.

Further, the software, instruction information, and the like may be transmitted and received via a transmission medium. For example, in a case where software is transmitted from a website, a server, another remote source using at least one of a wired technology (coaxial cable, optical fiber cable, twisted-pair, digital subscriber line (DSL), or the like) or a radio technology (infrared rays, microwaves, or the like), at least one of the wired technology or the radio technology is included within a definition of the transmission medium.

The terms "system" and "network" used in the present disclosure can be used interchangeably. The "network" may mean an apparatus (for example, a base station) included in the network.

In the present disclosure, terms such as "precoding", "precoder", "weight (precoding weight)" "quasi-co-location (QCL)", "transmission configuration indication state (TCI state)", "spatial relation", "spatial domain filter", "transmit power", "phase rotation", "antenna port", "antenna port group", "layer", "number of layers", "rank", "resource", "resource set", "resource group", "beam", "beam width", "beam angle", "antenna", "antenna element", and "panel" can be interchangeably used.

In the present disclosure, terms such as "base station (BS)", "radio base station", "fixed station", "NodeB", "eNodeB (eNB)", "gNodeB (gNB)", "access point", "transmission point (TP)", "reception point (RP)", "transmission/reception point (TRP)", "panel", "cell", "sector", "cell group", "carrier", and "component carrier", can be used interchangeably. The base station may be referred to as a term such as a macro cell, a small cell, a femto cell, or a pico cell.

The base station can accommodate one or a plurality of (for example, three) cells. In a case where the base station accommodates a plurality of cells, the entire coverage area of the base station can be partitioned into a plurality of smaller areas, and each smaller area can provide communication services through a base station subsystem (for example, small remote radio head (RRH) for indoors). The term "cell" or "sector" refers to a part or the whole of a coverage area of at least one of a base station or a base station subsystem that provide a communication service in this coverage.

In the present disclosure, the terms such as "mobile station (MS)", "user terminal", "user equipment (UE)", and "terminal" can be used interchangeably.

The mobile station may be referred to as a subscriber station, a mobile unit, a subscriber unit, wireless unit, a remote unit, a mobile device, a wireless device, a wireless communication device, remote device, a mobile subscriber station, an access terminal, a mobile terminal, a wireless terminal, a remote terminal, a handset, a user agent, a mobile client, a client, or some other appropriate terms.

At least one the base station or the mobile station may be referred to as a transmission apparatus, reception apparatus, a radio communication apparatus, or the like. Note that at least one of the base station and the mobile station may be a device mounted on a moving body, a moving body itself, and the like. The moving body may be a transportation (for example, car, an airplane and the like), an unmanned moving body (for example, a drone, an autonomous car, and the like), or a (manned or unmanned) robot. Note that at least one of the base station and the mobile station also includes an apparatus that does not necessarily move during a communication operation. For example, at least one of the base station or the mobile station may be an Internet of Things (IoT) device such as a sensor.

Further, the base station in the present disclosure may be replaced with the user terminal. For example, each aspect/embodiment of the present disclosure may be applied to a configuration in which communication between the base station and the user terminal is replaced with communication among a plurality of user terminals (which may be referred to as, for example, device-to-device (D2D), vehicle-to-everything (V2X), and the like). In the case, the user terminal 20 may have the function of the above-described base station 10. Further, terms such as "uplink" and "downlink" may be replaced with terms corresponding to communication between terminals (for example, "side"). For example, an uplink channel, a downlink channel, and the like may be replaced with a side channel.

Similarly, the user terminal in the present disclosure may be replaced with the base station. In this case, the base station 10 may have the function of the user terminal 20 described above.

In the present disclosure, the operation performed by the base station may be performed by an upper node thereof in some cases. In a network including one or a plurality of network nodes including the base station, it is clear that various operations performed for communication with the terminal can be performed by the base station, one or more network nodes (for example, mobility management entity (MME), a serving-gateway (S-GW), and the like are conceivable, but not limited thereto) other than the base station, or a combination thereof.

Each aspect/embodiment described in the present disclosure may be used alone, used in combination, or switched in association with execution. Further, the order of processing procedures, sequences, flowcharts, and the like of the aspects/embodiments described in the present disclosure may be re-ordered as long as there is no inconsistency. For example, regarding the methods described in the present disclosure, elements of various steps are presented using an illustrative order, and are not limited to the presented specific order.

Each aspect/embodiment described in the present disclosure may be applied to a system using long term evolution (LTE), LTE-advanced (LTE-A), LTE-beyond (LTE-B), SUPER 3G, IMT-Advanced, 4th generation mobile communication system (4G), 5th generation mobile communication system (5G), future radio access (FRA), new radio access technology (RAT), new radio (NR), new radio access (NX), future generation radio access (FX), Global System for Mobile communications (GSM (registered trademark)), CDMA 2000, ultra mobile broadband (UMB), IEEE 802.11 (Wi-Fi (registered trademark)), IEEE 802.16 (WiMAX (registered trademark)), IEEE 802.20, ultra-wideband (UWB), Bluetooth (registered trademark), or another appropriate radio communication method, a next generation system extended on the bass of these, and the like. Further, a plurality of systems may be combined (for example, a combination of LTE or LTE-A and 5G) and applied.

The phrase "on the basis of" as used in the present disclosure does not mean "on the basis of only", unless otherwise specified. In other words, the phrase "on the basis of" means both "on the basis of only" and "on the basis of at least".

Any reference to an element using designations such as "first" and "second" used in the present disclosure does not generally limit the amount or order of these elements. These designations can be used in the present disclosure, as a convenient way of distinguishing between two or more elements. Thus, reference to the first and second elements does not mean that only two elements are employed, or that the first element must precede the second element in some way.

The term "determining" used in the present disclosure may include a wide variety of operations. For example, "determining" may be regarded as "determining" of judging, calculating, computing, processing, deriving, investigating, looking up, search, inquiry (for example, looking up in a table, database, or another data structure), ascertaining, or the like.

Further, "determining" may be regarded as "determining" of receiving (for example, receiving information), transmitting (for example, transmitting information), inputting, outputting, accessing (for example, accessing data in a memory), and the like.

Further, "determining" may be regarded as "determining" of resolving, selecting, choosing, establishing, comparing, and the like. That is, "determining" may be regarded as "determining" of some operation.

Further, "determining" may be replaced with "assuming", "expecting", "considering", and the like.

The "maximum transmission power" described in the present disclosure may mean a maximum value of transmission power, a nominal maximum transmission power (the nominal UE maximum transmit power)) or a rated maximum transmission power (the rated UE maximum transmit power).

As used in the present disclosure, the terms "connected" and "coupled", or any variation of these terms, mean all direct or indirect connections or coupling between two or more elements, and may include the presence of one or more intermediate elements between two elements that are "connected" or "coupled" to each other. The coupling or connection between the elements may be physical, logical or a combination of these. For example, "connection" may be replaced with "access".

As used in the present disclosure, when two elements are connected, these elements may be considered to be "connected" or "coupled" to each other by using one or more electrical wires, cables, printed electrical connections, and the like, and, as some non-limiting and non-inclusive examples, by using electromagnetic energy and the like having wavelengths in the radio frequency, microwave, and optical (both visible and invisible) domains.

In the present disclosure, the phrase "A and B are different" may mean "A and B are different from each other". Note that the description may mean that "A and B are different from C". Terms such as "leave", "coupled", or the like may also be interpreted in the same manner as "different".

When the terms such as "include", "including", and variations of these are used in the present disclosure, these terms are intended to be inclusive, in a manner similar to the way the term "comprising" is used. Furthermore, the term "or" as used in the present disclosure is intended to be not an exclusive-OR.

In the present disclosure, when articles, such as "a", "an", and "the" are added in English translation, the present disclosure may include the plural forms of nouns that follow these articles.

Now, although invention according to the present disclosure has been described above in detail, it is obvious to those skilled in the art that the invention according to the present disclosure is by no means limited to the embodiments described in the present disclosure. The invention according to the present disclosure can be embodied with various corrections and in various modified aspects, without departing from the spirit and scope of the invention defined on the basis of the description of claims. Thus, the description of the present disclosure is for the purpose of explaining examples and does not bring any limiting meaning to the invention according to the present disclosure.

The invention claimed is:

1. A terminal comprising:
a transmitter that transmits capability information regarding support for a full power mode 2 and capability information regarding a transmitted precoding matrix indicator (TPMI) group; and
a processor that for the full power mode 2, when a TPMI indicated by downlink control information (DCI) which schedules a physical uplink shared channel (PUSCH) is included in the TPMI group, determines that a power scaling coefficient for the PUSCH is 1, otherwise determines that the power scaling coefficient is a number of antenna ports with non-zero PUSCH transmission power/a number of SRS ports associated with an SRS resource indicated by a sounding reference signal resource indicator (SRS Resource Indicator (SRI)) field of the DCI,
wherein the processor splits a linear value of the PUSCH transmission power scaled using the power scaling coefficient, equally across antenna ports with non-zero PUSCH transmission power, and
wherein the PUSCH transmission power is a power of a PUSCH transmission on an active uplink bandwidth part (BWP).

2. A radio communication method for a terminal, comprising:
transmitting capability information regarding support for a full power mode 2 and capability information regarding a transmitted precoding matrix indicator (TPMI) group; and
for the full power mode 2, when a TPMI indicated by downlink control information (DCI) which schedules a physical uplink shared channel (PUSCH) is included in the TPMI group, determining that a power scaling coefficient for the PUSCH is 1, otherwise determining that the power scaling coefficient is a number of antenna ports with non-zero PUSCH transmission power/a number of SRS ports associated with an SRS resource indicated by a sounding reference signal resource indicator (SRS Resource Indicator (SRI)) field of the DCI,
wherein the terminal splits a linear value of the PUSCH transmission power scaled using the power scaling coefficient, equally across antenna ports with non-zero PUSCH transmission power, and wherein the PUSCH transmission power is a power of a PUSCH transmission on an active uplink bandwidth part (BWP).

3. A base station comprising:

a receiver that receives capability information regarding support for a full power mode 2 and capability information regarding a transmitted precoding matrix indicator (TPMI) group;

a transmitter that transmits downlink control information (DCI) which schedules a physical uplink shared channel (PUSCH); and a processor that performs control to receive the PUSCH transmitted from a terminal, wherein for the full power mode 2, when a TPMI indicated by the DCI is included in the TPMI group, a power scaling coefficient for the PUSCH is determined to be 1, otherwise the power scaling coefficient is determined to be a number of antenna ports with non-zero PUSCH transmission power/a number of SRS ports associated with an SRS resource indicated by a sounding reference signal resource indicator (SRS Resource Indicator (SRI)) field of the DCI, wherein the terminal splits a linear value of the PUSCH transmission power scaled using the power scaling coefficient, equally across antenna ports with non-zero PUSCH transmission power, and wherein the PUSCH transmission power is a power of a PUSCH transmission on an active uplink bandwidth part (BWP).

4. A system comprising a terminal and a base station, wherein the terminal comprises:

a transmitter that transmits capability information regarding support for a full power mode 2 and capability information regarding a transmitted precoding matrix indicator (TPMI) group; and a processor that for the full power mode 2, when a TPMI indicated by downlink control information (DCI) which schedules a physical uplink shared channel (PUSCH) is included in the TPMI group, determines that a power scaling coefficient for the PUSCH is 1, otherwise determines that the power scaling coefficient is a number of antenna ports with non-zero PUSCH transmission power/a number of SRS ports associated with an SRS resource indicated by a sounding reference signal resource indicator (SRS Resource Indicator (SRI)) field of the DCI, wherein the processor splits a linear value of the PUSCH transmission power scaled using the power scaling coefficient, equally across antenna ports with non-zero PUSCH transmission power, and wherein the PUSCH transmission power is a power of a PUSCH transmission on an active uplink bandwidth part (BWP), and the base station comprises:

a receiver that receives the capability information regarding support for the full power mode 2 and the capability information regarding the TPMI group;

a transmitter that transmits the DCI; and a processor that performs control to receive the PUSCH.

\* \* \* \* \*